(12) United States Patent
Kliewer

(10) Patent No.: US 8,282,338 B2
(45) Date of Patent: Oct. 9, 2012

(54) UNDERWATER GENERATOR

(76) Inventor: Mark Kliewer, Fox Island, WA (US)

( * ) Notice: Subject to any disclaimer, the term of this patent is extended or adjusted under 35 U.S.C. 154(b) by 624 days.

(21) Appl. No.: 12/480,665

(22) Filed: Jun. 8, 2009

(65) Prior Publication Data

US 2010/0001528 A1   Jan. 7, 2010

Related U.S. Application Data

(60) Provisional application No. 61/059,336, filed on Jun. 6, 2008.

(51) Int. Cl.
| F03B 15/16 | (2006.01) |
| F03D 7/00 | (2006.01) |
| F04D 29/00 | (2006.01) |
| F04D 29/44 | (2006.01) |
| F01D 25/26 | (2006.01) |

(52) U.S. Cl. ....... 415/4.1; 415/2.1; 415/169.1; 415/201; 415/213.1; 415/905

(58) Field of Classification Search ............ 415/2.1–4.5, 415/60, 169.1, 201, 213.1, 121.1, 905–907
See application file for complete search history.

(56) References Cited

U.S. PATENT DOCUMENTS

| 1,275,951 | A | * | 8/1918 | Luick | 416/119 |
| 3,912,937 | A | * | 10/1975 | Lesser | 290/43 |
| 6,531,788 | B2 | * | 3/2003 | Robson | 290/43 |
| 7,042,114 | B2 | * | 5/2006 | Tharp | 290/54 |
| 2005/0001432 | A1 | * | 1/2005 | Drentham Susman et al. | 290/43 |
| 2007/0108768 | A1 | * | 5/2007 | Dempster | 290/42 |

* cited by examiner

*Primary Examiner* — Edward Look
*Assistant Examiner* — Su Htay
(74) *Attorney, Agent, or Firm* — Jerry D. Haynes; Law Office of Jerry D. Haynes

(57) ABSTRACT

An underwater generator for generating electricity including: a casing, a turbine propeller assembly configured within the casing; a platform, where the platform provides a mechanism to hold the casing; a cover member, where the cover member protects the turbine propeller assembly; and a power cable for transmitting electrical energy from the underwater generator to a user thereof. The casing may include a slit at a bottom portion, where the slit allows the removal of sediments, sand particles and similar materials. The turbine propeller assembly includes a plurality of blades. In one exemplary embodiment, the blades may turn in two directions.

8 Claims, 2 Drawing Sheets

UNDERWATER GENERATOR

CROSS REFERENCE TO RELATED APPLICATIONS

This application claims priority to U.S. Provisional Application No. 61/059,336 filed on Jun. 6, 2008.

FIELD OF THE INVENTION

The present invention generally relates to generators for generating electricity, and, more specifically, to a underwater generator capable of harnessing and converting energy into electricity by making use of stream and river water flow as well as tidal water flow.

DESCRIPTION OF RELATED ART

Generation of electricity involves converting various forms of energy such as thermal energy, mechanical energy, kinetic energy, and the like, into electrical energy. There are many ways to produce electricity. Electricity is generated by hydroelectric turbine power plants, gas turbine power plants, nuclear power plants, wind turbine plants, steam turbine plants, and the like. Presently, on a global scale, the majority of consumed energy is derived from oil. The oil resources and other fossil fuels are depleting at a very fast rate, and the demand for electricity is increasing day by day. Recognition and production of electricity by alternate resources, other than oil resources and other fossil fuels, are a forefront concern for most of the countries.

It will be pertinent to mention here that water covers 70 percent of the earth and nearly 97.5 percent of water is in seas and oceans. Statistical research has shown that hydroelectric power accounts only for about 10 percent of the total energy produced in the United States. The hydroelectric power plants are erected on rivers and attempts to tap tidal water flow of seas and oceans have experienced only nominal success.

The use of ocean currents to generate electrical power has been contemplated for some time. Attempts have been made for development of underwater generator. However, conventional underwater generators have not been successful so far. Blades of the conventional underwater generators collapse when they are being dragged against current. These underwater systems are all relatively complex, they appear unreliable for any great length of time, especially considering the harsh underwater environment of the ocean. The underwater environment is not only corrosive but also render the underwater systems inoperable because of the presence of wide variety of barnacles, weeds and the like, which attach themselves to mechanical parts of the underwater turbines. Further, as compared to a hydroelectric turbine power plant, the working of the conventional underwater generators is complex as blades of the turbines installed on the rivers and streams need to rotate in one direction only, whereas the blades of the conventional underwater generators are forced to rotate in both the directions by the tidal water flow, making the underwater turbines susceptible to breakdown.

Accordingly, there persists a need for an underwater generator that is capable of generating electricity by making use of stream and river water flow as well as tidal water flow in an easy, reliable and cost-effective manner. Further, there exists a need for the underwater generator that is simple in structural configuration.

Accordingly, it is an object of the present invention to obviate the above and other disadvantages from existing art and to provide a underwater generator that is capable of tapping and harnessing the natural energy associated with the oceans in the form of a recurring underwater action.

It is further an object of the present invention to provide a underwater generator capable of withstanding physical wear or damage resulting from the occasional violent thrust and receding movement of powerful ocean underwaters.

SUMMARY OF THE INVENTION

The present invention relates to a underwater generator for generating electricity comprising: a casing; a turbine propeller assembly configured within the casing; a platform, where said platform provides a means to hold the casing; a cover member, where said cover member protects the turbine propeller assembly; and a power cable for transmitting electrical energy from the underwater generator to a user thereof. The casing may include a slit at a bottom portion, where the slit allows the removal of sediments, sand particles and similar materials. The turbine propeller assembly includes a plurality of blades. In one exemplary embodiment, the plurality of blades may turn in one direction and in yet another exemplary embodiment, the blades may turn in two directions.

DESCRIPTION OF THE DRAWINGS

The advantages and features of the present invention will become better understood with reference to the detailed description taken in conjunction with the accompanying drawings, wherein like elements are identified with like symbols, and in which.

DESCRIPTION OF THE INVENTION

The present invention provides an underwater generator capable of generating electricity by making use of stream and river water flow as well as tidal water flow. The present invention can be easily incorporated at multitude of places which includes but is not limited to rivers, streams, seas, and oceans.

Figure 1:
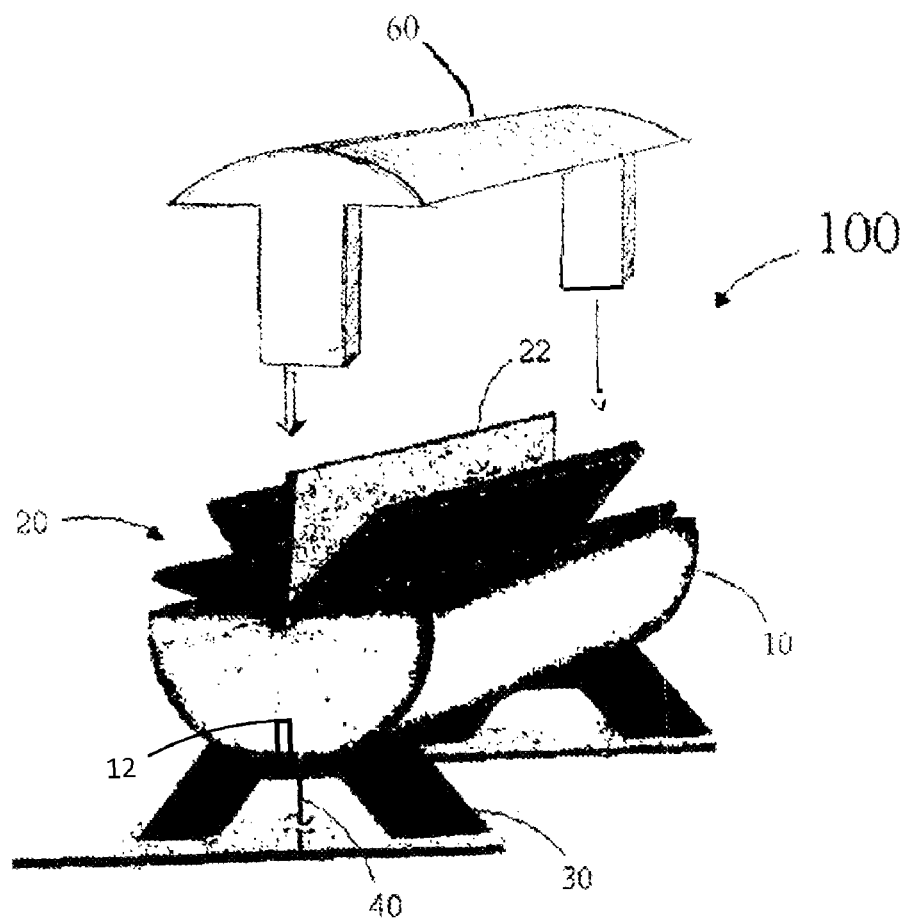
FIG. 1 illustrates a perspective view of a underwater generator, in accordance with an embodiment of the present invention.

As illustrated in FIG. 1, the present invention provides a underwater generator 100 for generating electricity. The underwater generator 100 includes a casing 10, a turbine propeller assembly 20 configured within the casing 10, a platform 30 configured to hold the casing 10, and a cover member 60 to protect the turbine propeller assembly 20. The components of the underwater generator 100 may be constructed of any material known in the art such as non-corrosive metals, non-corrosive alloy metals, space age composite materials and the like. The casing 10 includes a slit 12 at a bottom portion thereof to allow the removal of sediments, sand particles and the like brought into the casing 10 by the water current.

The turbine propeller assembly 20 includes a plurality of blades such as a blade 22 shown in FIG. 1. The shape, structural configuration and the number of blades of the plurality of blades as shown in FIG. 1 may not be construed as limiting and it will be evident to a person skilled in the art that the plurality of blades may have any shape, structural configuration and the number of blades known in the art. In an embodiment of the present invention, the underwater generator 100 may have a uni-directional turbine propeller assembly 20 in which the plurality of blades may move in one direction only. Such underwater generator 100 is better suited for generating electricity by making use of the stream and the river water flow. In another embodiment of the present invention, the underwater generator 100 may have a bi-directional turbine propeller assembly 20 in which the plurality of blades may move in both the directions. Such underwater generator 100 is employed for generating electricity making by use of the tidal water flow.

Further, the platform 30 is capable of being anchored at a river bed or an ocean bottom. The platform 30 provides a means to keep the casing 10 in a balanced position for withstanding violent thrust and receding movement of powerful ocean underwaters. The cover 60 protects the turbine propeller assembly 20 from solid matter that may otherwise be drawn toward the propeller assembly through the course of fluid flow, gravity, or any other motivation.

It will be pertinent to mention here that the underwater generator 100 is totally submerged in order to harvest the energy of the flowing ocean current. Further advantage of the total submersion of the underwater generator 100 is to save the aesthetic beauty of coastlines and seashores. Further, the underwater generator 100 is provided with a power cable 40 for transmitting electrical energy from the underwater generator 100 to a user thereof or a transmission means such as a transformer or other distribution device configured on the shore or any other place.

Figure 2:
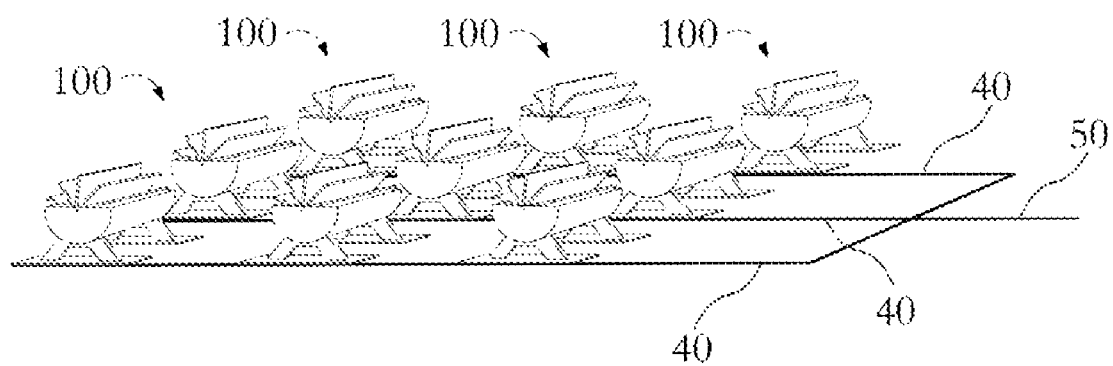
FIG. 2 illustrates a plurality of underwater generators comprising a underwater generator farm, in accordance with an embodiment of the present invention.

In use, a single underwater generator, such as the underwater generator 100, may be utilized as a unitary source for generating the electricity or a plurality of underwater generators such as the underwater generator 100 may be employed for generating electricity. FIG. 2 illustrates the plurality of underwater generators anchored at the river bed or the ocean bottom constituting a underwater generator farm. Power cables such as the power cable 40 from each underwater generator are configured in a manner to transmit the electrical energy to a user thereof or a transmission means through a collective cable 50.

The best mode for carrying out the present invention is presented in terms of its preferred embodiment, herein illustrated with reference to FIGS. 1 and 2. However, the present invention is not limited to the described embodiment and a person skilled in the art will appreciate that many other embodiments of the present invention are possible without deviating from the basic concept of the present invention and any such work around will also fall under scope of the present invention.

The present invention provides a better, efficient and economical means of generating electricity by harnessing the ocean current. The present invention, including the platform component, allows for efficient placement and retention of the generator underwater, which placement and retention requires less energy and effort than is required by other forms of water generators known in the art. The ability of the turbine propeller assembly 20 of the underwater generator 100 to move in both the directions helps the underwater generator 100 to withstand physical wear or damage resulting from the violent thrust and receding movement of powerful ocean waves and at the same time utilize both the incoming and the outgoing tidal water flow to generate electricity. Further, the underwater generator 100 is non-polluting, have no harmful effect on the environment like the turbines working on oil, and as such help in improving the ecosystem.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. An underwater generator for generating electricity comprising:
   a. a cylindrical casing;
   b. a turbine propeller assembly configured within the casing, where the turbine propeller assembly rotates as tidal water flows through the turbine propeller assembly to generate energy;
   c. a slit on the casing, where the slit allows debris accumulated from the tidal water to be removed from the casing, where said slit is positioned at a bottom portion of said casing, and where the debris includes sediments, sand particles and similar materials;
   d. a platform, where said platform holds the casing, and where the platform anchors the underwater generator to a bottom surface of a body of water;
   e. a cover member, where said cover member protects the turbine propeller assembly; and
   f. a power cable for transmitting electrical energy from the underwater generator to a user thereof.

2. The underwater generator according to claim 1, where the turbine propeller assembly includes a plurality of blades.

3. The underwater generator according to claim 2, where the plurality of blades turn in one direction.

4. The underwater generator according to claim 2, where the plurality of blades turn in two directions.

5. A system of underwater electrical energy generation comprising:
   a. a plurality of underwater generators, where each generator includes,
      i. a cylindrical casing;
      ii. a turbine propeller assembly configured within the casing, where the turbine propeller assembly rotates as tidal water flows through said turbine propeller assembly to generate energy;
      iii. a slit on the casing, where the slit allows accumulated debris from the tidal water to be removed from the casing, where said slit is positioned at a bottom portion of the casing, and where the debris includes sediments, sand particles and similar materials;
      iv. a platform, where said platform holds the casing, and where said platform anchors the underwater generator to a bottom surface of a body of water;
      v. a cover member, where said cover member protects the turbine propeller assembly; and
   b. a plurality of power cable for transmitting electrical energy from each underwater generator to a collective power transmission cable, where the collective power transmission cable transmits a composite electrical energy to a user thereof.

6. The system of underwater electrical energy generation according to claim 5, where each the turbine propeller assembly includes a plurality of blades.

7. The system of underwater electrical energy generation according to claim 6, where the plurality of blades turn in one direction.

8. The system of underwater electrical energy generation according to claim 6, where the plurality of blades turn in two directions.

* * * * *